Aug. 29, 1950   H. W. UNDERWOOD ET AL   2,520,584
ARMREST COVER
Filed Feb. 25, 1949
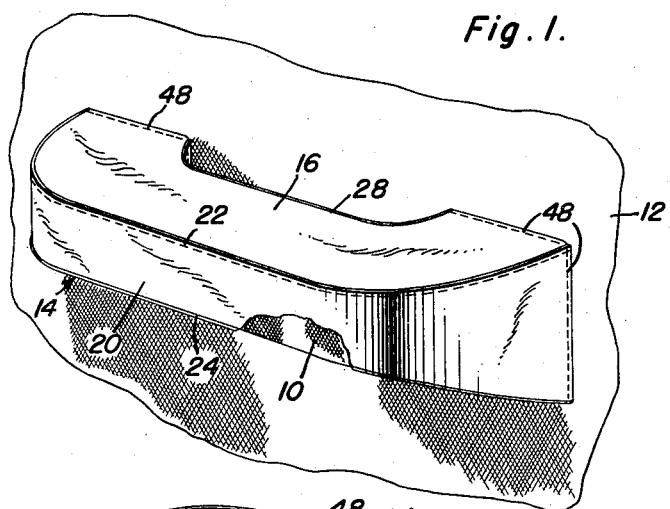
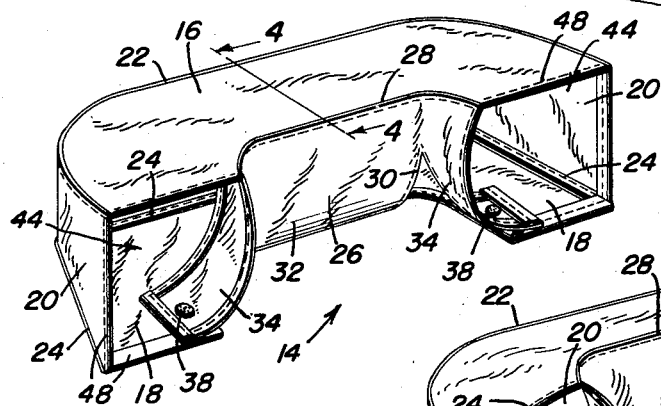
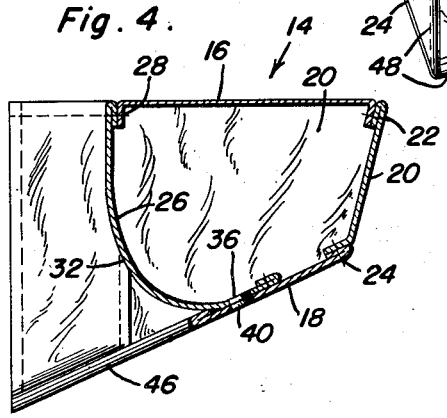
Inventors
Harold W. Underwood
Walter Broker
By Clarence A. O'Brien
and Harvey B. Jacobson
Attorneys

UNITED STATES PATENT OFFICE 2,520,584

ARMREST COVER

Harold W. Underwood and Walter Broker, Cincinnati, Ohio

Application February 25, 1949, Serial No. 78,336

3 Claims. (Cl. 155—182)

This invention relates to new and useful improvements and structural refinements in arm rest covers, and the principal object of the invention is to provide a protective cover for the arm rest which is customarily associated with the front door of an automobile for the convenience of front seat occupants. It is, of course, a common expedient to provide the front seat itself with a cover, but the arm rest, perhaps by virtue of the fact that it is attached to the door, generally is not considered as a component of the front seat and a protector therefor is not usually provided.

As has been already stated, it is the primary object of the instant invention to provide such a cover, although it should be understood that this cover may be used on the arm rest regardless of whether or not a cover is provided on the front seat itself.

The invention is particularly intended for use in association with that type of an arm rest which, being substantially U-shaped in configuration, also functions as a handle for opening and closing the door from the inside, and an important feature of the invention resides in the provision of means for removably retaining the cover in position on the combined arm rest and handle as will be hereinafter described.

Some of the advantages of the invention reside in its simplicity of construction, in its pleasing appearance, and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a perspective view of the invention in situ on a combined handle and arm rest;

Figure 2 is a perspective view of the invention per se, showing the same in its closed or applied position;

Figure 3 is a perspective view, similar to that shown in Figure 2, but illustrating the invention in its open position in readiness for application or removal; and, Figure 4 is a fragmentary cross sectional view, taken substantially in the plane of the line 4—4 in Figure 2.

Like characters of reference are employed to designate like parts in the specification and throughout the several views.

Referring now to the accompanying drawings in detail, the reference character 10 designates a combined handle and arm rest of a conventional type, the same being substantially U-shaped in configuration and being secured at the ends thereof to the inside door panel 12 of an automobile, the invention consisting of a cover for the combined handle and arm rest, the cover being designated generally by the reference character 14.

The cover 14 is preferably formed from flexible material such as cloth, or the like, and consists of a substantially U-shaped casing including a top wall 16, a bottom wall 18 and an outside wall 20 which is secured at its upper and lower edges to the outer edges of the top and bottom walls 16, 18 respectively, as indicated by the respective characters 22, 24.

What may be referred to as a sectional inside wall 26 is secured as at 28 at the upper edge thereof to the inside edge of the top wall 16, this inside wall being notched as at 30, so that it is separated into a plurality of bendable sections or flaps 32, 34.

The flaps 32, 34 are provided on the lower end portion thereof with snap-on fastening elements 36, 38 respectively, which are separably engageable with coacting elements 40, 42 provided on the bottom wall 18, as shown.

The entire cover is, of course, adapted to fit the configuration of the combined handle and arm rest 10, and when the invention is placed in use, the cover is simply applied to the handle by placing the top wall 16, bottom wall 18 and outside wall 20 on the respective corresponding surfaces of the arm rest, whereupon the flaps 32, 34 of the inside wall 26 are drawn toward the inside surface of the arm rest and the respective fasteners 36, 38 are engaged with the fasteners 40, 42, whereby the entire cover is firmly and securely retained in position on the arm rest.

It is to be noted that the cover may be applied to the arm rest and removed therefrom without the necessity of removing the arm rest from the door panel 12, this being facilitated by the provision of flaps 32, 34 and the open ends 44 on the cover, as is best shown in Figures 2 and 3.

Inasmuch as the bottom surface of the arm rest is usually downwardly sloped, the bottom wall 18 may be sloped accordingly, as indicated at 46 in Figure 4, and if desired, the end edges of the walls 16, 18, 20 at the open ends 44 of the cover may be hemmed, as indicated at 48.

It is believed that the advantages and use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. For use in association with a combined vehicle door handle and arm rest having a U-shaped configuration and secured at the ends thereof to a door, a protective cover comprising a substantially U-shaped casing formed from flexible material and including a top wall, a bottom wall, an outside wall secured to outer edges of the top and bottom walls, and a sectional inside wall secured to the inner edge of the top wall, said casing being positionable on the combined handle and arm rest with said walls thereof covering the respective corresponding surfaces of the combined handle and arm rest, and common means for attaching the sectional inside wall to the bottom wall and removably retaining said casing in position.

2. The device as defined in claim 1 wherein said sectional inside wall consists of a plurality of flaps having upper edges secured to the inner edge of the top wall, said means comprising fastening elements provided on the lower end portions of said flaps and coacting fastening elements on said bottom wall.

3. A combined door handle and arm rest cover comprising a casing having U-shaped upper and lower walls of flexible material, an outside wall secured to the outer edges of the top and bottom walls, an inside wall secured to the inner edge of the top wall, said inside wall having a pair of spaced transverse slits extending upwardly from the lower edge thereof, said U-shaped upper and lower walls each having a web portion and leg portions extending transversely of said web portion, said slits dividing said inner wall into an intermediate portion and end portions, means for fastening said intermediate portion and said end portions to said web and leg portions respectively of said bottom wall.

HAROLD W. UNDERWOOD.
WALTER BROKER.

REFERENCES CITED

The following references are of record in the file of this patent:

UNITED STATES PATENTS

| Number | Name | Date |
|---|---|---|
| 1,809,292 | Fry | June 9, 1931 |
| 2,057,551 | Bishop | Oct. 13, 1936 |